United States Patent
Aizikowitz et al.

(10) Patent No.: US 7,757,169 B2
(45) Date of Patent: *Jul. 13, 2010

(54) SYSTEM AND METHOD FOR EFFICIENT PRODUCTION OF DYNAMIC DOCUMENTS

(75) Inventors: Jacob Aizikowitz, Haifa (IL); Israel Roth, Ra'anana (IL); Reuven Sherwin, Ra'anana (IL)

(73) Assignee: XMPie (Israel) Ltd., Netanya (IL)

( * ) Notice: Subject to any disclaimer, the term of this patent is extended or adjusted under 35 U.S.C. 154(b) by 918 days.

This patent is subject to a terminal disclaimer.

(21) Appl. No.: 11/205,195

(22) Filed: Aug. 17, 2005

(65) Prior Publication Data

US 2005/0278614 A1    Dec. 15, 2005

Related U.S. Application Data

(63) Continuation of application No. 09/775,501, filed on Feb. 5, 2001, now Pat. No. 6,948,115.

(60) Provisional application No. 60/180,124, filed on Feb. 3, 2000.

(51) Int. Cl.
*G06F 17/00* (2006.01)
(52) U.S. Cl. .................................. 715/255
(58) Field of Classification Search ................. 715/200, 715/255
See application file for complete search history.

(56) References Cited

U.S. PATENT DOCUMENTS

| | | | |
|---|---|---|---|
| 4,815,029 A | 3/1989 | Barker et al. | |
| 5,381,523 A | 1/1995 | Hayashi | |
| 5,515,490 A | 5/1996 | Buchanan et al. | |
| 5,555,362 A * | 9/1996 | Yamashita et al. | 715/209 |
| 5,671,403 A | 9/1997 | Shekita et al. | |
| 5,748,805 A | 5/1998 | Withgott et al. | |
| 5,802,518 A | 9/1998 | Karaev et al. | |
| 5,805,784 A | 9/1998 | Crawford | |
| 5,806,068 A | 9/1998 | Shaw et al. | |
| 5,844,991 A | 12/1998 | Hochberg et al. | |
| 5,895,476 A | 4/1999 | Orr et al. | |
| 5,924,109 A | 7/1999 | Ackerman et al. | |

(Continued)

FOREIGN PATENT DOCUMENTS

WO    WO 99/22312    5/1999

OTHER PUBLICATIONS

Ito et al., A Visual Environment for Dynamic Web Application Composition, ACM 2003, pp. 184-193.*

(Continued)

*Primary Examiner*—Cong-Lac Huynh
(74) *Attorney, Agent, or Firm*—Pearl Cohen Zedek Latzer, LLP (57) ABSTRACT

A production system and method for producing a VIPDL output stream from a dynamic document and a recipients list including a data iterator for iterating through the recipients list one record at a time and computing values for each dynamic object in the dynamic document for the record, a document instantiator for creating an instance document for the record, an output generator operating in tandem with the document instantiator for generating code specifying the rendering of the document instance, and a merge component for generating the VIPDL output stream from output of the output generator.

6 Claims, 3 Drawing Sheets

U.S. PATENT DOCUMENTS

| | | | |
|---|---|---|---|
| 5,937,153 | A | 8/1999 | Gauthier |
| 6,006,242 | A | 12/1999 | Poole et al. |
| 6,134,018 | A | 10/2000 | Dziesietnik et al. |
| 6,137,483 | A * | 10/2000 | Kiyono et al. ............... 715/234 |
| 6,209,010 | B1 | 3/2001 | Gauthier et al. |
| 6,243,172 | B1 | 6/2001 | Gauthier et al. |
| 6,332,149 | B1 | 12/2001 | Warmus et al. |
| 6,381,028 | B1 | 4/2002 | Gauthier |
| 6,487,568 | B1 | 11/2002 | Gauthier et al. |
| 6,526,182 | B2 * | 2/2003 | Morita ........................ 382/284 |
| 6,599,325 | B2 | 7/2003 | Gauthier et al. |
| 6,687,016 | B2 | 2/2004 | Gauthier |
| 6,725,227 | B1 | 4/2004 | Li |
| 6,771,387 | B2 | 8/2004 | Gauthier |
| 6,826,727 | B1 | 11/2004 | Mohr et al. |
| 6,910,053 | B1 | 6/2005 | Pauly et al. |
| 6,965,920 | B2 * | 11/2005 | Pedersen .................... 709/206 |
| 6,999,117 | B2 * | 2/2006 | Yamazaki ................ 348/222.1 |
| 7,039,863 | B1 * | 5/2006 | Caro et al. .................. 715/209 |
| 7,106,469 | B2 | 9/2006 | Simpson et al. |
| 7,131,062 | B2 * | 10/2006 | Nguyen et al. .............. 715/201 |
| 2001/0047369 | A1 | 11/2001 | Aizikowitz et al. |
| 2002/0013722 | A1 | 1/2002 | Kanaga |
| 2002/0049702 | A1 | 4/2002 | Aizikowitz et al. |
| 2003/0033212 | A1 | 2/2003 | Sandhu et al. |
| 2003/0050934 | A1 | 3/2003 | Gauthier et al. |
| 2004/0002972 | A1 | 1/2004 | Pather et al. |
| 2004/0130752 | A1 | 7/2004 | Gauthier |
| 2004/0141197 | A1 | 7/2004 | Gauthier |
| 2004/0186851 | A1 | 9/2004 | Jhingan et al. |
| 2004/0204989 | A1 | 10/2004 | Dicker et al. |
| 2005/0114394 | A1 * | 5/2005 | Kaipa et al. ............... 707/104.1 |
| 2005/0278614 | A1 | 12/2005 | Aizikowitz et al. |
| 2005/0278621 | A1 * | 12/2005 | Aizikowitz et al. ......... 715/513 |
| 2006/0253537 | A1 * | 11/2006 | Thomas ...................... 709/206 |
| 2007/0118801 | A1 * | 5/2007 | Harshbarger et al. ........ 715/730 |

OTHER PUBLICATIONS

Clarke, Aspect-Oriented Design with Theme/UML, Google Apr. 2004, pp. 1-8.*

Mehra et al. A Generic Approach to Supporting Diagram Differencing and Merging of Collaborative Design, ACM 2005, pp. 204-213.*

Vemuri R., "Performance Modeling Using PDL", IEEE Computer, Apr. 1996, vol. 29, Issue 4, pp. 44-53.

International Search Report for PCT/US01/03613 dated Jun. 19, 2001.

Isakowitz et al., "Toward a Logical/Physical Theory of Spreadsheet Modeling", Jan. 1995, vol. 13, Issue 1, pp. 1-37.

Supplementary European Search Report for Application No. EP 01 90 5427 dated Mar. 30, 2009.

* cited by examiner

SYSTEM AND METHOD FOR EFFICIENT PRODUCTION OF DYNAMIC DOCUMENTS

CROSS REFERENCE TO RELATED APPLICATIONS

This application is a continuation application of U.S. patent application Ser. No. 09/775,501, filed on Feb. 5, 2001 now U.S. Pat. No. 6,948,115 which in turn claims priority from U.S. Provisional Patent Application 60/180,124, filed Feb. 3, 2000 and entitled "A System For Efficient Production Of Dynamic Documents", which applications are incorporated in their entirety herein by reference.

FIELD OF THE INVENTION

The present invention relates to the production of personalized documents in print, Web, e-mail, and other media types. The invention is a production process introducing efficiencies that are facilitated by use of a media-independent representation of documents.

BACKGROUND OF THE INVENTION

Today, it is quite common to personalize documents with, for example, a reader's name or other information specific to one reader or a group of readers. An example is an advertising mass mailing that has been personalized with the addressee's name, offered goods, and special prices on the offered goods, all selected and calculated according to the addressee's past purchasing from the company making the offer. This document personalization exists in both World Wide Web (web) documents and printed documents.

The process of generating the personalized copies of documents includes three major phases: creation, production and rendering. Creation includes planning, design, programming, and authoring. Production is the phase in which target media formats are generated for rendering a specified set of personalized copies. Rendering is the phase in which printing or web-presentment actually occurs.

The production of such documents generates output format specification for rendering personalized instances of the documents in the desired target media (e.g., PostScript for print, available from Adobe Systems Inc., San Jose, Calif., USA). Existing tools are either media-specific (e.g., Darwin for print, available from CreoScitex, Burnaby, British Columbia, Canada), or use rendering instructions that have no explicit specification of variability.

SUMMARY OF THE INVENTION

There is provided, in accordance with an embodiment of the present invention, a production system for producing a VIPDL output stream from a dynamic document and a recipients list. The system includes a data iterator for iterating through the recipients list one record at a time and computing values for each dynamic object in the dynamic document for the record, a document instantiator for creating an instance document for the record, an output generator operating in tandem with the document instantiator for generating code specifying the rendering of the document instance, and a merge component for generating the VIPDL output stream from output of the output generator.

Additionally, in accordance with an embodiment of the present invention, the VIPDL output stream may be defined in an object-oriented (rendering) specification language.

Furthermore, in accordance with an embodiment of the present invention, the object-oriented specification language may be VPS.

Moreover, in accordance with an embodiment of the present invention, the object-oriented specification language may be PPML.

Further, in accordance with an embodiment of the present invention, the VIPDL output stream may be defined in HTML.

Still further, in accordance with an embodiment of the present invention, the production system may include a content objects buffer for allowing the data iterator and the document instantiator to operate in a producer consumer manner.

Additionally, in accordance with an embodiment of the present invention, the merge component may include a definitions dictionary including reusable object names and their definitions, a booklets section including layout information for pages of dynamic document instances, and a merge processor for generating the VIPDL output stream from contents of the definitions dictionary and the booklets section.

There is further provided, in accordance with an embodiment of the present invention, a production system for producing a VIPDL output stream from a dynamic document and a recipients list. The production system includes a parts generator for breaking the recipients list into a plurality of parts, a plurality of pipelines for parallel processing of the recipients list, a plurality of definitions dictionaries for receiving reusable object definitions from the plurality of pipelines, a plurality of booklets sections for receiving layout information from the plurality of pipelines, and a merge processor for generating the VIPDL output stream from contents of the plurality of definitions dictionary and the plurality of booklets section.

There is provided, in accordance with an embodiment of the present invention, a method for producing a VIPDL output stream from a dynamic document and a recipients list. The method includes the steps of selecting a next record from the recipients list, generating a document instance from the dynamic document for the selected record from the recipients list, generating entries in a definition dictionary corresponding to reusable objects in the dynamic document, generating a rendering specifications section for the generated document instance, concatenating the rendering specifications section into the VIPDL output stream, repeating the step of selecting, the first step of generating, the second step of generating, the third step of generating, and the step of concatenating until the recipients list has been exhausted, and generating an elements definition section from the information in the definitions dictionary and pre-pending the elements definition section at the head of the VIPDL output stream.

Furthermore, in accordance with an embodiment of the present invention, the step of selecting, the first step of generating, the second step of generating, the third step of generating, the step of concatenating, the step of repeating, and the fourth step of generating may be performed by pipeline processing.

Additionally, in accordance with an embodiment of the present invention, the first step of generating may also include the steps of collapsing all the queries for the set of dynamic content objects into one query and computing the one query.

Still further, in accordance with an embodiment of the present invention, the first step of generating may also include the steps of caching views generated by queries and reusing the cached views.

There is provided, in accordance with an embodiment of the present invention, a method for producing a VIPDL output stream from a dynamic document and a recipients list. The method includes the steps of dividing the recipients list into a plurality of distinct parts, performing parallel processing independently for each of the parts, and merging a plurality of definition dictionaries and a plurality of rendering specifications sections created in the step of performing into one VIPDL output stream corresponding to the entire recipients list.

Additionally, in accordance with an embodiment of the present invention, the step of performing may further include the step of using a gossiping mechanism to reduce redundancy in the plurality of definition dictionaries.

Moreover, in accordance with an embodiment of the present invention, the step of performing may further include the steps of selecting a next record from the recipients list, generating a document instance from the dynamic document for the selected record from the recipients list, generating entries in a definition dictionary corresponding to dynamic content objects in the dynamic document, generating a rendering specifications section for the generated document instance, concatenating the rendering specifications section into the VIPDL output stream, repeating the step of selecting, the first step of generating, the second step of generating, the third step of generating, and the step of concatenating until the recipients list has been exhausted, and generating an elements definition section from the information in the definitions dictionary and pre-pending the elements definition section at the head of the VIPDL output stream.

Additionally, in accordance with an embodiment of the present invention, the first step of generating may also include the steps of collapsing all the queries for the set of the dynamic content objects into one query and computing the one query minimizing joins.

Moreover, in accordance with an embodiment of the present invention, the first step of generating may also include the steps of collapsing all the queries for the set of the dynamic content objects into one query and computing the one query minimizing re-selections.

Furthermore, in accordance with an embodiment of the present invention, the first step of generating may also include the steps of caching views generated by queries and reusing the cached views.

There is provided, in accordance with an embodiment of the present invention, a method for query optimization. The method includes the step of collapsing all the queries for a set of dynamic content objects into one query.

Moreover, in accordance with an embodiment of the present invention, the method may further include the step of computing the one query minimizing joins.

Furthermore, in accordance with an embodiment of the present invention, the method may further include the step of computing the one query minimizing re-selections.

Still further, in accordance with an embodiment of the present invention, the method may further include the steps of caching views generated by queries and reusing the cached views.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Applicants have developed a system and method that produces documents in a variety of media types from a single, media-independent, representation of a dynamic document. Moreover, Applicants use pipeline processing, rules optimization, and concurrent processing to obtain optimizations in processing time and memory requirements.

In order to produce a set of personalized copies of a document, the process must be presented with proper instructions. Regardless of any specific format for encoding these instructions, they must cover the following major elements: design layout, data, and rules.

Design is defined as page designs, also known as layouts. An InDesign (available from Adobe Systems Inc.) document is an example of a page design. Other exemplary representations include QuarkXPress (available from Quark, Inc., Denver, Colo., USA) native formats, XML (extensible Style Language) pages, HTML (HyperText Markup Language) pages, etc.

Data includes sets of data records (e.g., demographic information) and content elements (e.g., pictures, graphics, video clips, and text sections). One set of records—the prime set—is the one against which the specification of the desired recipients ("the recipients list") is given (e.g., Employees set, with key begin employee_id and a recipients list that is simply a list of employee_ids).

Rules are a set of rules that specify what the dynamic objects are, how to calculate their values for a given recipient, and where and how to place these values into a given page layout.

An exemplary representation of instructions that associates the design and data and also presents the rules is described in U.S. patent application "A System And Method For Creating Customized Documents For Cross Media Publishing", filed on the same day as the present U.S. patent application, and assigned to the common assignee of the present invention. U.S. patent application, "A System And Method For Creating Customized Documents For Cross Media Publishing", is incorporated herein by reference. It is noted that any suitable identification system may be used; the above-mentioned patent is one example of a suitable system. Hence, the invention here is not limited to this specific representation. Any representation that provides design, data, and rules information in an appropriate manner may be used. The term "dynamic document" hereinbelow is defined to include any such encoding.

As stated above, the production phase generates the formats for the chosen target media. The final rendering may be generated by any rendering medium, including a World Wide Web (web) browser, e-mail package, or a print controller (e.g., a Raster Image Processor (RIP)).

Figure 1:
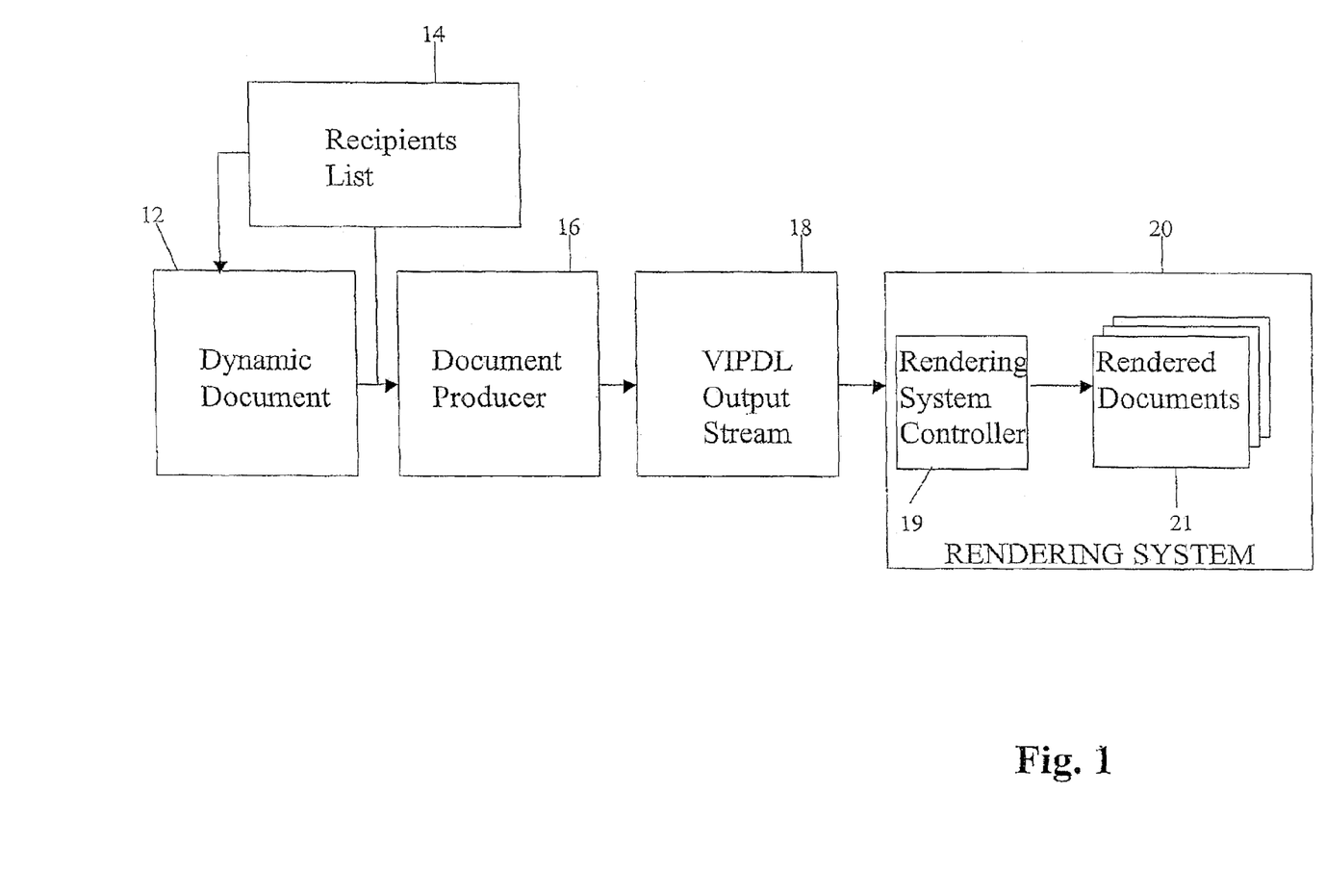
FIG. 1 is a block diagram illustration of a production system, constructed and operative in accordance with an embodiment of the present invention.

Reference is now made to FIG. 1, a high-level block diagram of a production system constructed and operative in accordance with an embodiment of the present invention. The production system comprises a document producer 16 operative in conjunction with a dynamic document 12 and a recipients list 14, and generates a VIPDL output stream 18. VIPDL output stream 18 is an output stream written in a "variable information page description language" (VIPDL) as described hereinbelow. The VIPDL output stream 18 is input to rendering system 20, wherein a rendering system controller 19 is responsible for the physical creation of the rendered documents 21.

It is an aspect of the invention that the output is produced in a VIPDL. For print production systems exemplary languages are VPS (Variable Print Specification) (available from CreoScitex) and PPML (Personalized Print Markup Language) (available from Print on Demand Initiative, West Henrietta, N.Y., USA). For the web an exemplary language is HTML. Thus in the current invention an appropriate VIPDL is used, targeted to the rendering system, allowing cross-media production from any original design system. Classical print specifications such as PDF (Portable Document Format) (available from Adobe Systems Inc.) or PostScript can be used without affecting the scope of the invention. Naturally, when such formats are used instead of the VIPDL, important information about reusability of objects across the whole job may be lost thus making the rendering process (which is not part of this invention) less efficient.

Furthermore, the use of any specific layout design type in the design specification does not imply the use of that type in the output specification. For example, it is possible to use a layout of type InDesign and yet render the document instances on the web in HTML. Likewise, a web design tool may be used to create the documents and yet they may be rendered directly as printed pages in a document, without ever having been displayed on the web.

In the creation of the HTML output specification, the VIPDL output stream 18 generated may actually comprise a group of HTML pages. Each such page represents one instance of the document, rather than the VIPDL output stream 18 consisting of a single stream, as it would for a print document.

In a further embodiment of the present invention, several HTML pages may together represent an instance. In such a case there will be links from one page of the instance to the others.

A simple and straightforward process for producing personalized instances of a dynamic document 12 is to do the following repeatedly: select, compute, create, generate, and append until recipients list 14 is empty. These actions are defined as follows:

select the next record from recipients list 14,
  use the rules of dynamic document 12 to compute the values for each dynamic object for the recipient represented by the selected record,
  create a document instance for this record,
  generate the code that specifies the rendering of this document instance (e.g., PostScript, PPML, HTML, etc.), and
  append this code to VIPDL output stream 18.

The problem with this process is that it is inefficient in several key areas. The simple, step by step execution of the select and compute phases may result in a significant number of redundant operations, which leads to unnecessarily slow processing. Furthermore, the explicit creation of a digital representation for each document instance is not necessary. In addition, generating print specification code based on each document instance independently does not leverage the similarity across the different instances. Use of this similarity could allow savings by not regenerating code for elements that have already been processed. This may lead to further savings in communicating the specification to a renderer (e.g., a print controller) or in processing the code by the renderer. Furthermore, it does not include concurrent processing that would take advantage of the independence between instances.

Systems that allow significant preprocessing prior to production may gain production efficiencies, though typically only for batch mode production and only for a pre-selected media type. However, such systems generally loose either flexibility or ease-of-use, for example, due to very primitive and rigid levels for specification of design, rules, or even data.

Thus, an aspect of the present invention is that dynamic document representations that leave full flexibility for changing any one of the components (design, data, or rules) at any time and go immediately to production (i.e., without lengthy preprocessing steps) are preferred. Most representations of dynamic documents 12, for example that described in U.S. patent application "A System And Method For Creating Customized Documents For Cross Media Publishing", do not induce dependencies between the processing needed for one instance and another.

It is in the areas of rules computation, instance generation, explicit reusability, and concurrency that the method and system described hereinbelow provide innovation.

Figure 2:
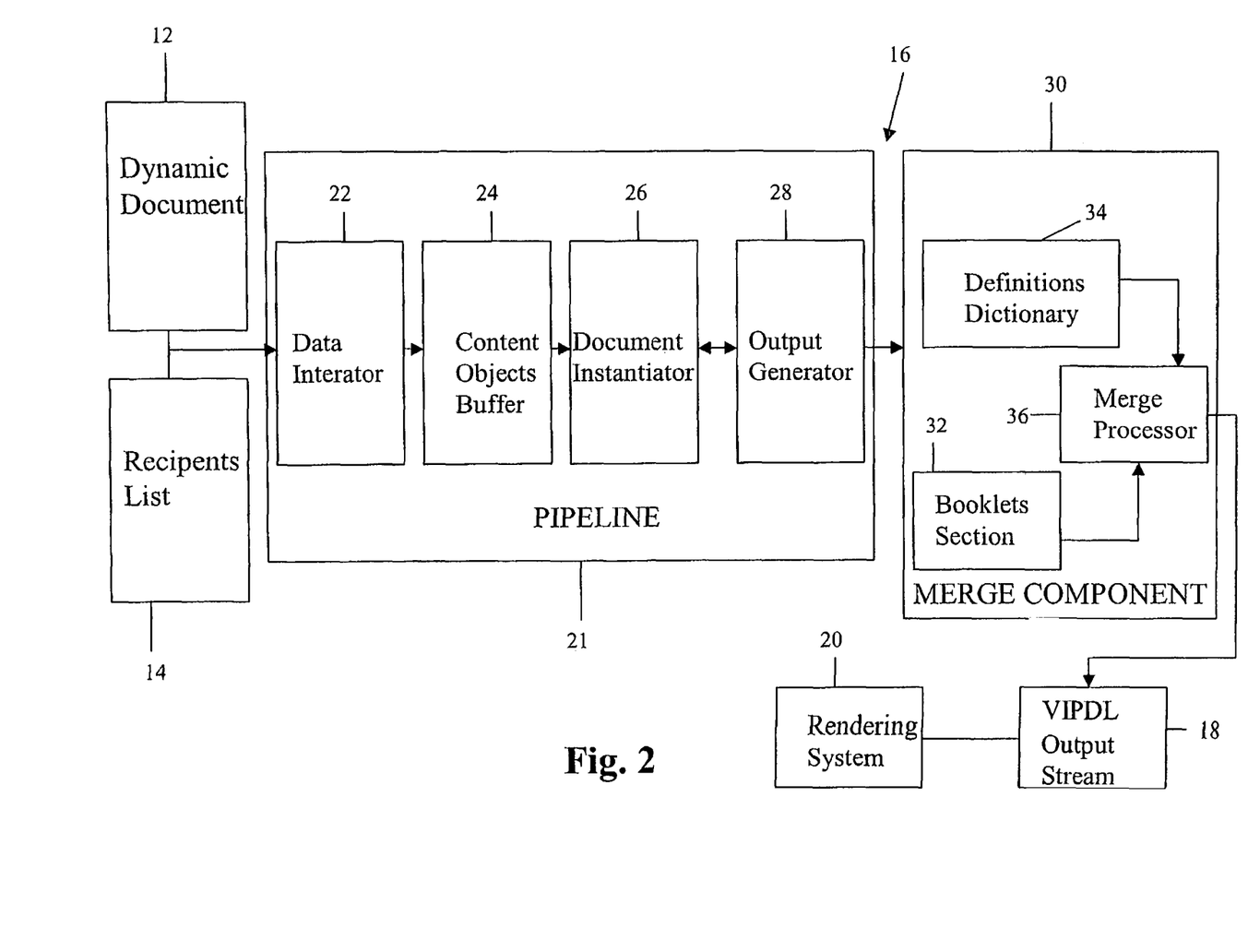
FIG. 2 is block diagram illustration showing details of the production system of FIG. 1, constructed and operative in accordance with an embodiment of the invention.

Reference is now made to FIG. 2, a schematic block diagram showing details of the production system of FIG. 1, including the building blocks of document producer 16, constructed and operative in accordance with an embodiment of the invention. Document producer 16 comprises a pipeline 21 and a merge component 30. Pipeline 21 comprises a data iterator 22, a content objects buffer 24, a document instantiator 26, and an output generator 28. Merge component 30 comprises a booklets section 32 and a definitions dictionary 34 that are input to merge processor 36. Booklets section 32 comprises at least one booklet, which comprises at least one page. Each page includes instructions regarding the placement of dynamic objects on the page. Definitions dictionary 34 comprises at least one definition of a reusable object wherein a definition comprises the reusable object name and its description. The description comprises the code (either in some recognized PDL (Print Description Language) format, such as PostScript, or in an image format, such as GIF) specifying the object appearance. Merge controller 36 generates VIPDL code that comprises a definitions section and booklets section 32, which is sent to VIPDL output stream 18 and then to rendering system 20.

Data iterator 22 performs the select and compute steps described hereinabove. Data Iterator 22 puts its output into content objects buffer 24 from whence document instantiator 26 retrieves it as input. Document instantiator 26 works in tandem with output generator 28 in performing the create and generate steps. Hereinbelow when referring to the joint performance of these steps, these two components will be referred to as instantiator-generator 26-28. Document instantiator 26 creates only as much of the instance as is needed by output generator 28. Merge processor 36 does the append step.

Document producer 16 as described herein allows optimizations in computations that are part of the processing done by data iterator 22, pipeline processing involving the subsystems above, and the use of concurrent pipelines.

Pipeline Processing

The production method of the present invention uses the architecture of the producer process and the properties of the representation of dynamic document 12 to employ a three-stage pipeline process. The first stage is performed by data iterator 22, the second stage is performed by instantiator-generator 26-28, and the third stage is performed by merge component 30.

Content objects buffer 24 allows data iterator 22 to work in a "producer/consumer" relationship with document instantiator-generator 26-28. Data iterator 22 performs the data processing task that is induced by selecting the next record from recipients list 14 and computes the set of page layouts and content objects needed for this instance. The result of the computation is forwarded to document instantiator 26 via content objects buffer 24. Data iterator 22 continues computing layouts and content objects for document instances for as long as recipients list 14 has not been exhausted and the buffer storage is not full (or some other "watermark" like condition is satisfied).

Instantiator-generator 26-28 retrieve the next collection of layouts and content objects from the content objects buffer 24, employ the layout engine that is appropriate for the layouts in the collection for automatically creating the specific instance, and while doing so generate the needed parts of the rendering specification. In the most generic sense, the rendering specification consists of two parts: a definitions section, which has definitions of all reusable objects in the rendering job, and booklets section 32, which has the specifications for the rendering of all specified instances.

Merge processor 36 may either create a single definitions section and then a single booklets section 32 or it can interleave definitions sections followed by booklets sections 32 for booklets all of whose objects already have appeared in a definitions section.

From an implementation-efficiency point of view it is preferable to use definitions dictionary 34 for representing the items that should appear in the definition sections. Only at the final stage when the full VIPDL output stream 18 is emitted, is definitions dictionary 34 translated to the definitions section. It is noted that a particular implementation may choose to use the definitions section directly and skip the phase of definitions dictionary 34 altogether.

Booklets section 32, which specifies the pages of the document instance, uses references to reusable objects defined in definitions dictionary 34 (possibly by processes that handled the generation of previous instances) and immediate (i.e., literal) code for items that are unique for the document instance represented by this booklet. Instantiator-generator 26-28 continue generating entries in definitions dictionary 34 and booklets in booklets section 32 as long as content objects buffer 24 is not empty (or, again, some watermark like property holds) and as long as the storage buffer for booklets section 32 and definitions dictionary 34 is not full (again, watermark).

The third step of the pipeline is performed by merge process 36, which is also pipelined by buffer and information availability. This is a straightforward process that generates VIPDL output stream 18. It merges the definitions contained in definitions dictionary 34 and generates the definitions section at the head of VIPDL output stream 18. It then appends the stream of the merged booklets section 32. Again, if the rendering specification needs the definitions and booklets to be intermixed, the method of the present invention will allow for it.

The merge process may get rid of redundant definitions of reusable objects or break the stream into smaller sets that can be better processed by the printing system.

Parallel Pipelines

Figure 3:
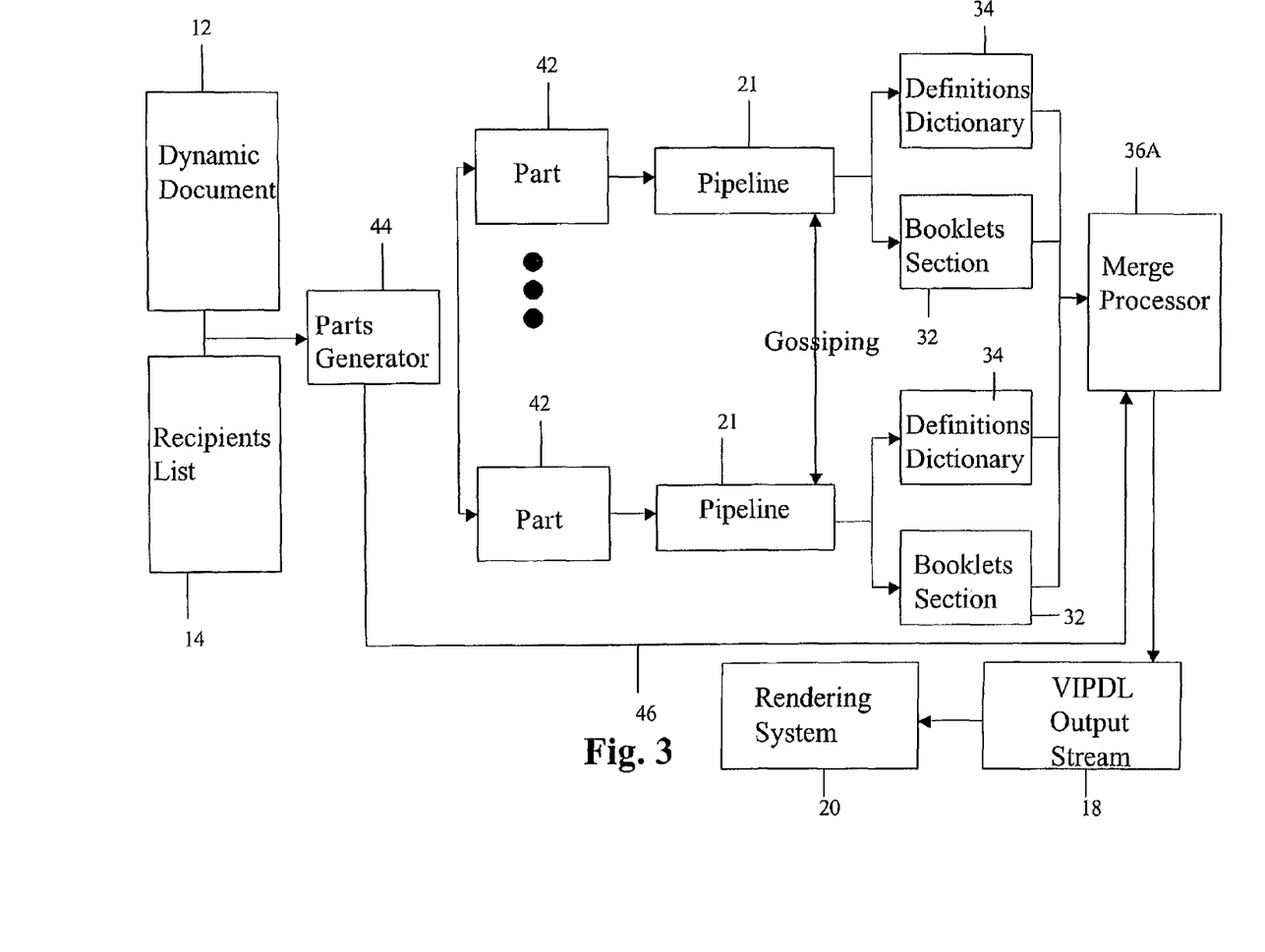
FIG. 3 is a schematic block diagram of a production system, constructed and operative in accordance with a further embodiment of the present invention.

A further embodiment of the present invention is the ability to concurrently launch several pipelines. This ability to generate instances separately is due to instance independence as discussed hereinabove. Reference is now made to FIG. 3, a schematic block diagram of a production system constructed and operative in accordance with an embodiment of the present invention. The production system comprises a parts generator 44, a multiplicity of parts 42, a multiplicity of pipelines 21, a multiplicity of definitions dictionaries 34, a multiplicity of booklets sections 32, and a merge processor 36A operative in conjunction with dynamic document 12, recipients list 14, VIPDL output stream 18, and rendering system 20.

Given recipients list 14, it is possible to break it into a collection of separate sets herein referred to as parts 42, where each part 42 preserves the order of items in the original list and each part 42 is identified so that order among the parts may be preserved. As an example, consider a recipients list 14 of cardinality 100,000. It is possible to break it into 10 parts of 10,000 items each, where the first part 42 consists of the first 10,000 items of the original list, the second part 42 consists of items 10,001 through 20,000 of the original list, and, in general, the nth part 42, for $1 \leq n \leq 10$, consists of items $(n-1)*10,000+1 \wedge (n-1)*10,000+10,000$. Creating order-preserving parts 42 is only necessary if order was a property of the original list. For example, if the records in the recipients list 14 appeared in, for example, zip code order, then it would be important that order within parts 42 and among parts 42 be preserved.

The system uses a parts generator 44 that breaks recipients list 14 into appropriate parts 42 and launches an individual pipeline 21 for each part 42. Parts generator 44 indicates to the merge process via arrow 46 the number of parts 42 and their relative order.

Each pipeline 21 operates autonomously, in parallel with all other pipelines 21. Each pipeline 21 generates its own booklets section 32 and definitions dictionary 34, where these are properly identified by the order information generated by the parts generator 44. Merge processor 36A is not part of any a single pipeline 21 but, rather, processes the merging of all the booklets section 32—definitions dictionary 34 pairs into one coherent VIPDL output stream 18.

A unique problem created by breaking the list into parts 42 and launching several pipelines 21 in parallel is the use of elements defined in the definitions dictionary 34 of one pipeline 21 by booklets section 32 of another pipeline 21. Two extreme solutions exist;: one is called "no sharing", and the other "lockstep sharing".

The no sharing solution lets each pipeline 21 work autonomously and create entries in its definitions dictionary 34 for any reusable object that it defines. (It may make references to reusable objects that are not defined in its dictionary, assuming that another pipeline 21 will insert the missing definition into its definitions dictionary 34.) This makes the parallelism perfect but creates many redundant definitions across the definitions dictionaries 34 of different pipelines 21. This increases the memory load, the load on the merge process, and the load on instantiator-generator 26-28 because of the need to generate definitions for items that have already been defined in another pipeline 21. If the merge process does not handle the removal of redundant definitions, then this becomes a load on rendering system controller 17 (FIG. 1).

The lockstep-sharing solution forces the dissemination of any new entry in the definitions dictionary 34 of one pipeline 21 to all other pipelines 21 and the assurance that none uses redundant information. This method is optimal in resolving the inefficiencies above. It does not, however, give the needed freedom to each pipeline 21 to make progress at its own pace, thus potentially slowing the overall system.

The solution provided by the production system of the present invention uses sharing but without the strict lockstep requirements. Taking advantage of the fact that redundancy in different definitions dictionaries 34 does not create correctness problems, the system described herein employs a "gossip"-like algorithm for the dissemination of definitions dictionary 34 information among the concurrent pipelines 21. The term "gossip" for disseminating information in distributed processing was first coined by Liskov and Ladin from MIT. Each pipeline process informs all other pipeline processes of new definitions dictionary 34 entries that it generates, as shown by arrow labeled "gossiping". It does not, however, wait to see that all pipelines 21 have received and processed each entry, nor does it suspend itself to make sure that it has received the new entries from others prior to making further steps. Once a process receives such a gossip message, it checks whether the gossiped entry has already been defined in its definitions dictionary 34. If it has been, then the process ignores the gossip. If the gossiped definitions dictionary 34 entry has not been previously added to the process' definitions dictionary 34, then it is added. The correctness of this scheme is based on the assumption that names of reusable elements are generated in a way that makes them unique; they do not depend on the generation-time or the ID of the generating process. In other words, any pipeline process will give exactly the same name for a reusable object that represents a specific content object (for example by concatenating the name of the content object variable with the name of the item from content that was selected for this instance).

The gossip method does not guarantee that there will be no redundancies. It improves the chances that the redundancy-count will be low, and thus improves overall performance.

Query Optimizations

It is noted that hereinbelow the terms "query" and "view" are used interchangeably. A query allows generating some "virtual" records by combing several database-tables through certain logic, typically joins. In certain situations these tables of virtual records are called views.

A major performance problem of data Iterator 22 could result from the need to use complex queries in order to evaluate the rules for a given instance which will result in the set of layouts or content objects for a given instance. It is quite likely that there will be several dynamic objects per instance, each with its own query (i.e., rule). Yet, these queries may have some common parts among them. Moreover, when evaluating the dynamic objects for consecutive instances, the queries simply repeat.

Data Iterator 22 performs query optimization techniques in generating each instance of a dynamic document. Data Iterator 22 first combines all the dynamic objects into one result record and collapses all the individual queries into one query that produces the full result record. This will result in the full set of content objects for the given instance at once. Two optimization criteria are used in collapsing the set of queries. One is minimizing joins. The other is minimizing the repeated selection of the same record.

Minimizing Joins

Consider, for example, that information derived from a recipient record indicates a book-preference. Based on that preference, several records of the "books" view are retrieved. Each one of these books records determines a set of dynamic objects comprising for example book name, cover picture, book description, book author, book price. The values of these dynamic objects are derived simply by projecting (as defined in relational algebra) the books record on these attributes and assigning the values of the attributes to the corresponding content objects.

Now, assume that the books view is the result of some joins on several books-related tables (e.g., price—<id, $>, author—<id, name>, description—<id, text>, cover—<id, image>, etc.). It would be quite beneficial to avoid performing the joins for each dynamic object.

Minimizing Re-Selections

Assuming that the optimization method saves the redundant joins, it would still be a waste of time to re-select the set of preferred books for each dynamic object. Thus in collapsing the individual queries an attempt is made to reuse a selected record of a record-set by doing a multiple assignment of all the relevant fields of that record to all relevant dynamic objects.

Further Query Optimization

A further optimization is achieved by performing the above techniques across different instances of dynamic document 12. Views generated by queries that are defined in terms of joins are cached and saved subject to memory constraints. Finally, an attempt is made to reuse the cached views rather than regenerate them from the computed queries.

Further Embodiments

One method for gaining access to the HTML "document" produced is to provide a lead HTML page that may serve a classical login function, possibly including the automatic retrieval of the login information of the user. Based on the login information, the specific HTML file that represents the document instance generated for the logged-in user may be presented.

In a further embodiment of the present invention, the HTML pages of the instance document may be generated only upon demand. In other words, once the login information of a particular user has been received, the system of the present invention is invoked for generating the particular document instance for the user.

In a still further embodiment of the present invention the mechanism used for accessing the HTML document instance may be in an e-mail message that has a URL pointing to the specific document instance of the user. Alternatively, the HTML page(s) may be embedded in the e-mail message itself.

It will be appreciated by persons skilled in the art that the present invention is not limited by what has been particularly shown and described herein above. Rather the scope of the invention is defined by the claims that follow:

What is claimed is:

1. A production system for producing a variable information page description language (VIPDL) output stream from a dynamic document comprising a layout and a plurality of dynamic objects, each dynamic object representing an object having content to be determined based on recipient record data and a recipients list comprising a plurality of recipient records, each recipient record including a plurality of values for respective data fields associated with each respective recipient, said system comprising:

a parts generator for breaking said recipients list into a plurality of parts, each said part including a plurality of recipient records in said recipients list;

a plurality of pipelines, for receiving and respectively parallel processing each of said parts of said recipients list, wherein each said pipeline is to produce values for reusable object definitions based on a application of dynamic objects in said dynamic document to each recipient record in the part of said recipients list being processed;

a plurality of definitions dictionaries for storing values of said reusable object definitions produced by said plurality of pipelines;

a plurality of booklets sections for storing layout information from said plurality of pipelines based on said layout of said dynamic document; and a merge processor to generate a VIPDL output stream by merging values contents of said reusable object definitions stored in said definitions dictionaries into said layout information in said booklets sections.

2. A method for producing a variable information page description language (VIPDL) output stream from a dynamic document comprising a layout and a plurality of dynamic objects, each dynamic object representing an object having content to be determined based on recipient record data and a recipients list comprising a plurality of recipient records, each recipient record including a plurality of values for respective data fields associated with each respective recipient, said method comprising:

breaking said recipients list into a plurality of parts, each said part including a plurality of recipient records in said recipients list;

parallel processing each of said recipients list parts by producing values for reusable object definitions based on application of dynamic objects in said dynamic document to each recipient record in the part of said recipients list being processed using a plurality of pipelines;

storing values of reusable object definitions produced by said plurality of pipelines in a plurality of definitions dictionaries;

storing layout information in a plurality of booklet sections, said layout information based on said layout of said dynamic document; and merging values of said reusable object definitions retrieved from said definitions dictionaries into said layout information retrieved from said booklets sections to produce a VIPDL output stream.

3. The method of claim 2, further comprising:

receiving a plurality of queries for a set of dynamic content objects; and collapsing all of said queries into one query, wherein said query is processed for each recipient record on each of said parts of said recipients list.

4. The method according to claim 3, further comprising computing said one query minimizing joins.

5. The method according to claim 3, further comprising computing said one query minimizing re-selections.

6. The method according to claim 3, further comprising the steps of:

caching views generated by queries; and reusing said cached views.

* * * * *